United States Patent

[11] 3,623,932

[72] Inventor Edwin S. Woodhall
 Cuyahoga Falls, Ohio
[21] Appl. No. 14,100
[22] Filed Feb. 25, 1970
[45] Patented Nov. 30, 1971
[73] Assignee The Goodyear Tire & Rubber Company
 Akron, Ohio

[54] TUBE SPLICER
 46 Claims, 25 Drawing Figs.
[52] U.S. Cl..................................................... 156/503,
 156/507
[51] Int. Cl...................................................... B29h 15/04,
 G03c 15/04
[50] Field of Search........................................... 156/502,
 503, 507

[56] References Cited
 UNITED STATES PATENTS
 2,660,216 11/1953 Clayton et al................ 156/503
 2,696,866 12/1954 Vanzo........................ 156/503

Primary Examiner—Benjamin A. Borchelt
Assistant Examiner—J. J. Devitt
Attorneys—F. W. Brunner and Harlan E. Hummer ABSTRACT: A machine for splicing rubber inner tubes. The machine has a pair of heated knives which move in parallel, generally rectangular, vertical pathways to cut exposed, aligned ends of a clamped tube immediately prior to moving and squeezing the freshly cut ends together in splicing engagement. Each knife moves vertically to a position for engaging an adjacent tube end, and then transversely across the tube. Immediately upon cutting disengagement with the tube, the knife again moves vertically and to a position out of interfering relation with the moving clamps which bring and hold the tube ends in compressive, splicing engagement.

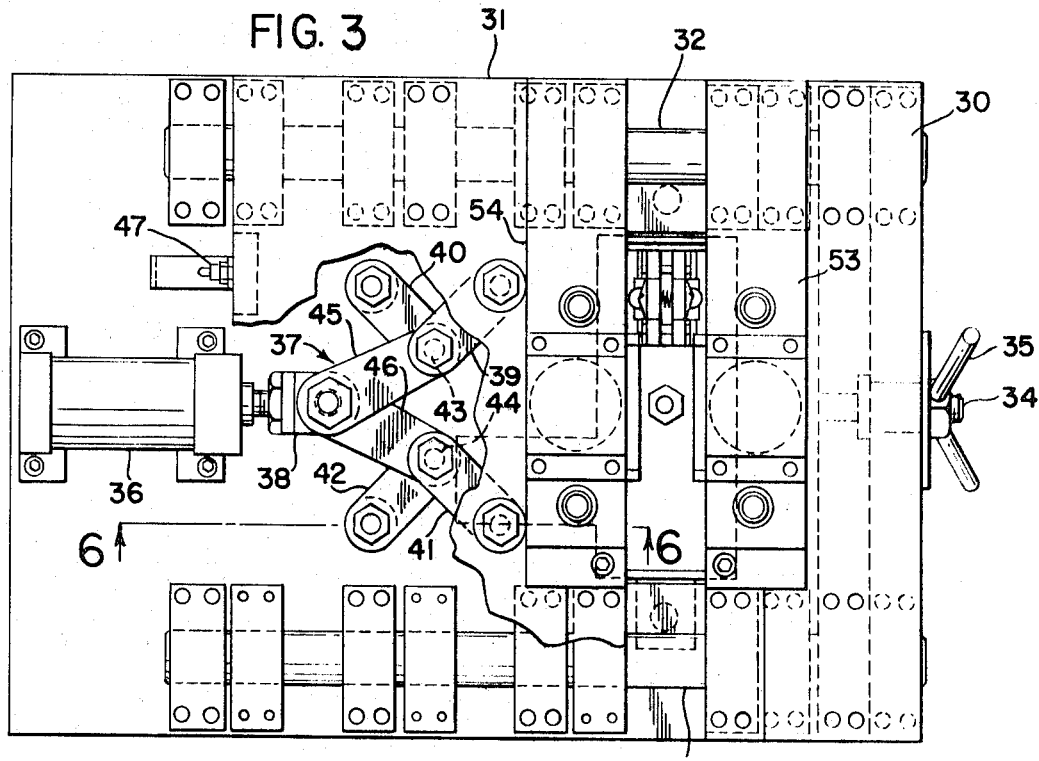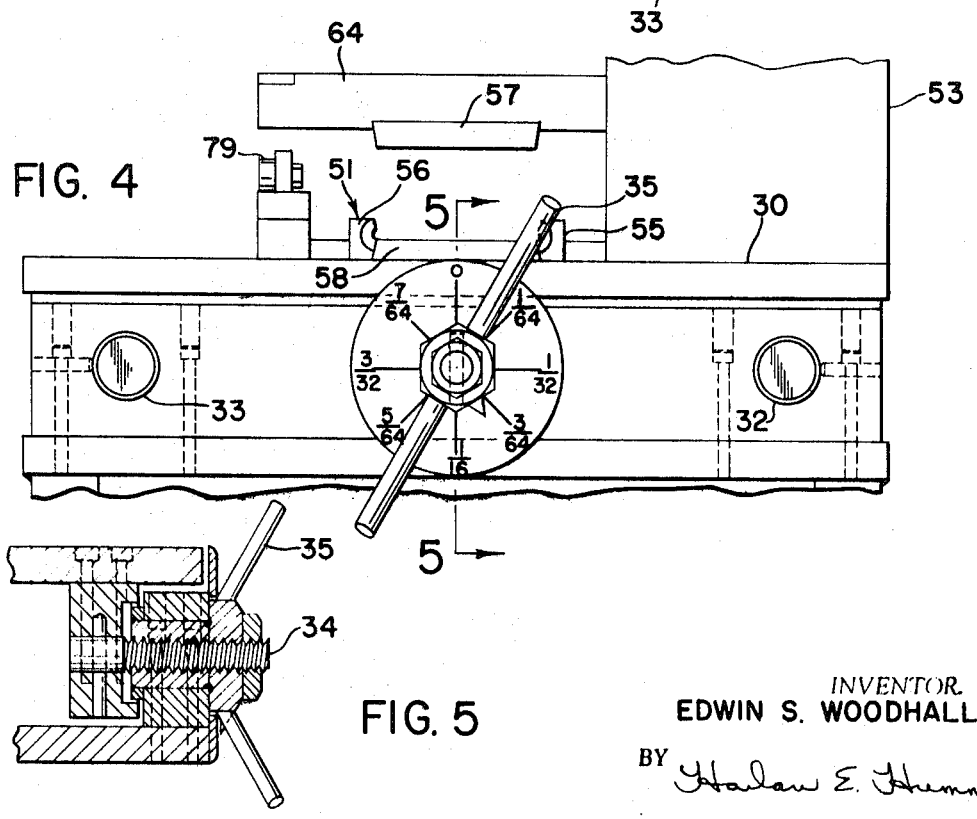

INVENTOR.
EDWIN S. WOODHALL
BY Harlan E. Hummer
ATTORNEY

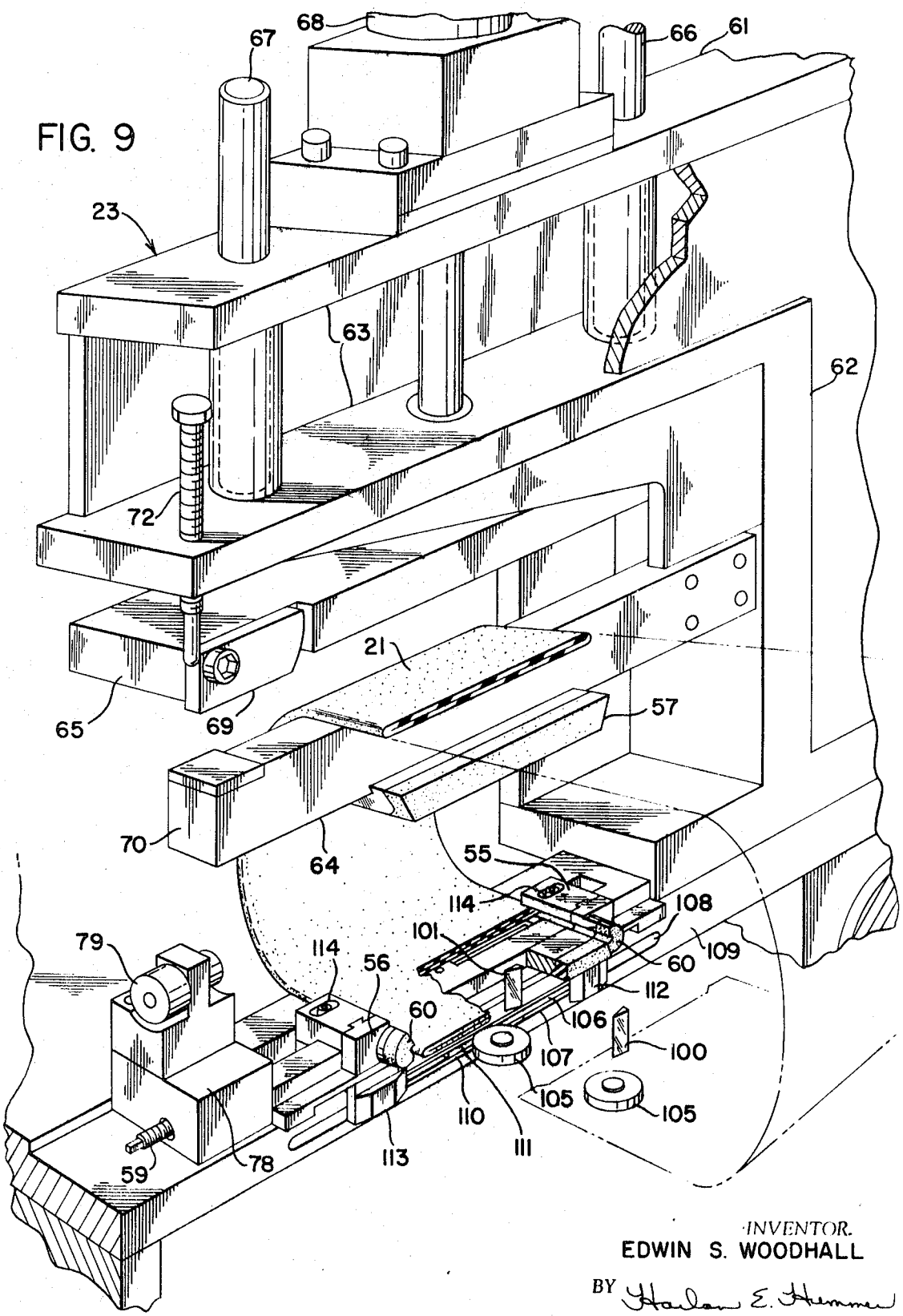

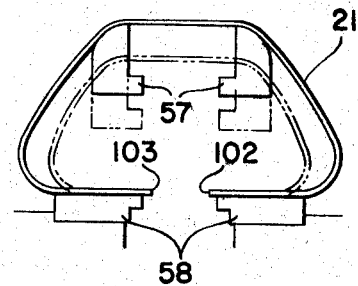
FIG. A
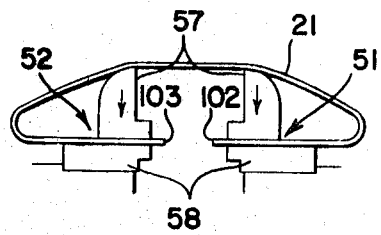
FIG. B
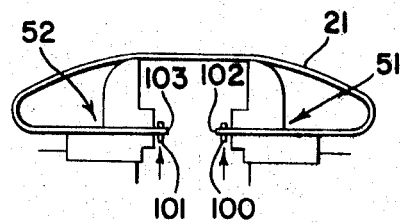
FIG. C
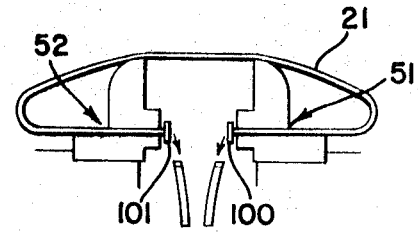
FIG. D
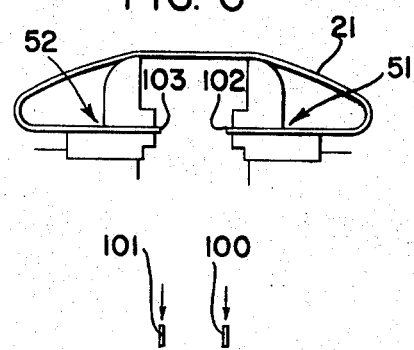
FIG. E
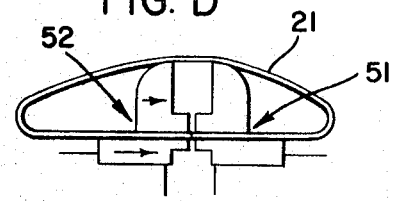
FIG. F
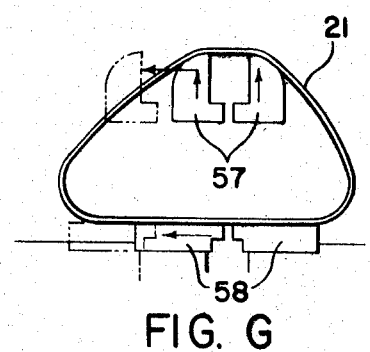
FIG. G
FIG. 17
*INVENTOR.*
EDWIN S. WOODHALL
BY Harlan E. Hummer
ATTORNEY

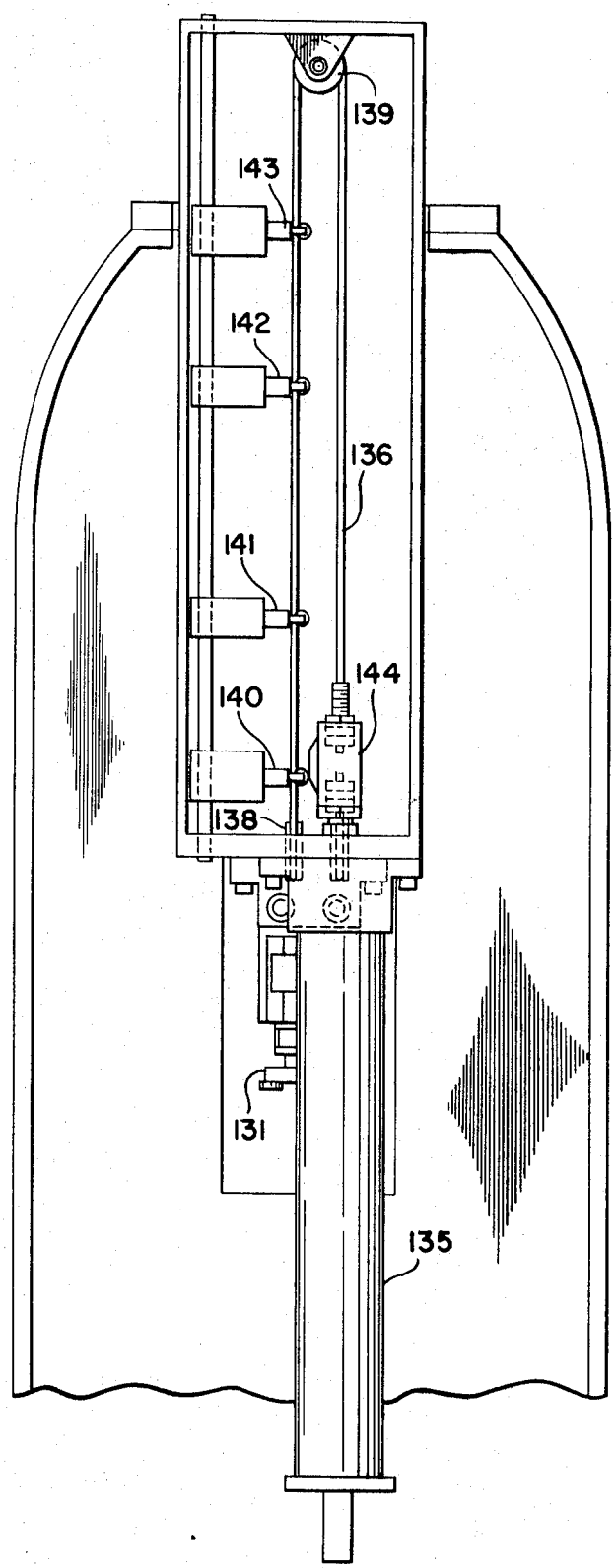

3,623,932

TUBE SPLICER

BACKGROUND OF THE INVENTION

A tube splicer, as it is commonly referred to, is a machine for joining the exposed ends of a flat, sleevelike unvulcanized rubber inner tube, which has been cut into predetermined lengths according to the size of tube desired. The tube ends are flat when they are clamped in the machine for cutting and splicing engagement. The machine is designed to recut the exposed, aligned ends of the tube and immediately bring the freshly cut ends into compressive engagement forming the splice. The tube is then unclamped and removed from the machine and cured or vulcanized.

An important factor in making a good splice is the time lapse between making the cut and joining the freshly cut ends together, since exposing the freshly cut rubberized material to the atmosphere for a considerable period of time adversely affects the bond between the rubberized material. Thus, the pathway along which the cutting knives move becomes exceedingly important, especially in an automatic machine where the knives must generally return to their home base or rest position before the mechanism for moving and squeezing the tube ends together, can be actuated and operated. An important aspect of the invention is the provision of a tube splicer wherein the pathway of the cutting knives is such that the interval of time between making the cut and joining the tube ends together has been substantially reduced.

Briefly stated, the invention is a tube splicer comprising a pair of clamps for holding adjacent exposed ends of a tube in axially, aligned relation. Means are provided for moving the clamps relative to each other to bring the freshly cut ends of the tube into compressed, splicing engagement. A cutting assembly with a set of knives for engaging and cutting the exposed tube ends prior to bringing them together, includes means for positioning the knives in spaced vertical relation relative to the clamps, means for moving the knives vertically to a position for engaging the tube ends, means for moving the knives transversely across the tube ends, and means for moving the knives vertically and to a position out of interfering relation with the clamps as they bring the freshly cut tube ends into compressive, splicing engagement.

DESCRIPTION OF THE DRAWING

The following description of the invention will be better understood by having reference to the annexed drawing, wherein:

FIG. 3 is a plan view of the squeeze assembly with portions cut away to show the operating mechanism;

FIG. 4 is a partial side elevation of the machine viewed from the line 4—4 of FIG. 1;

FIG. 5 is a section of the machine viewed from the line 5—5 of FIG. 4;

FIG. 9 is a perspective view of the clamp assembly;

FIGS. 17A–17G are schematic views showing the sequential operations for cutting and joining the ends of an inner tube positioned in the machine;

FIG. 19 is a view from the line 19—19 of FIG. 18.

DESCRIPTION OF THE INVENTION

Figure 1:
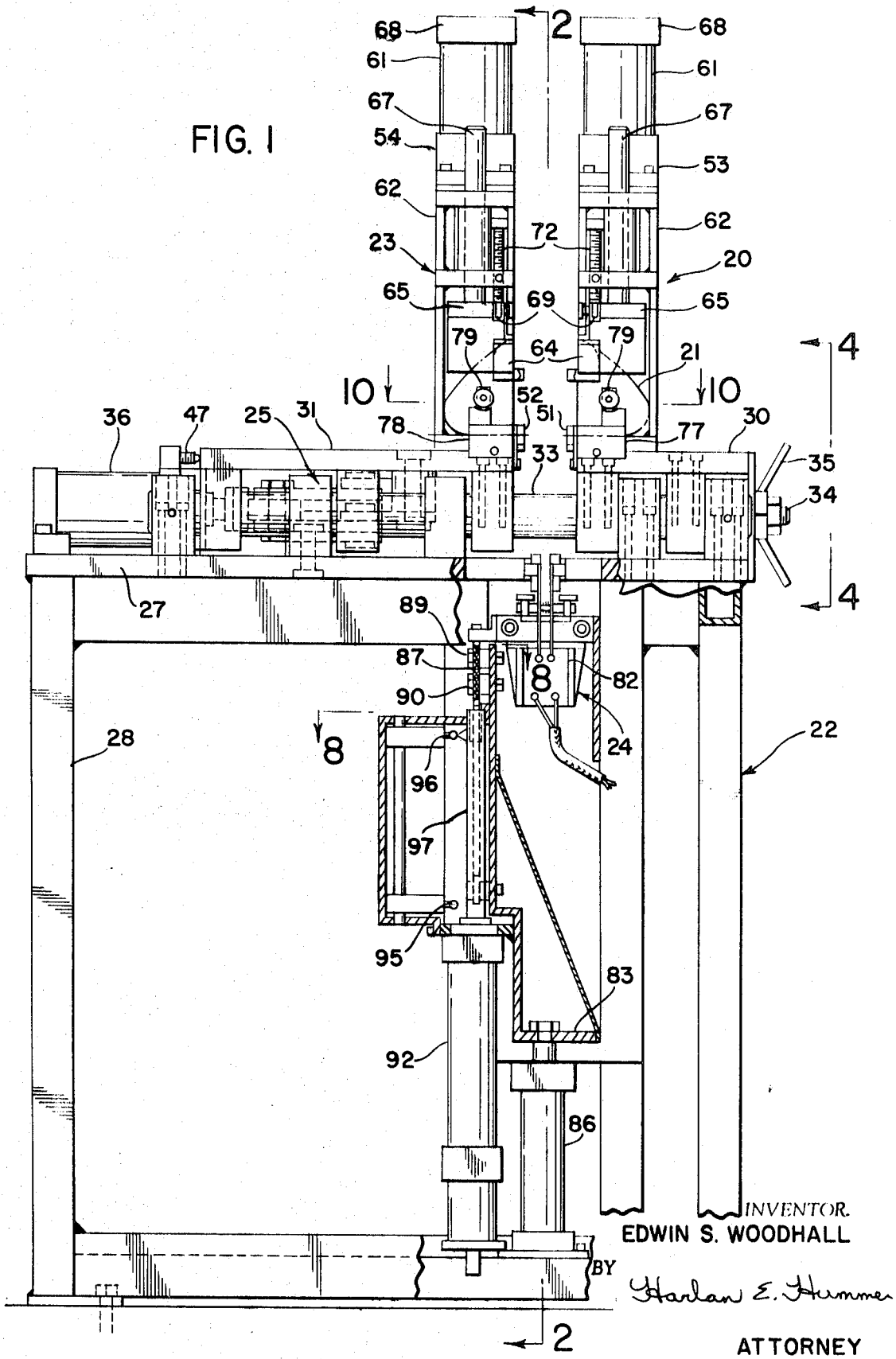
FIG. 1 is a front view of a tube splicer with portions cut away to expose certain components of the machine.
Figure 2:
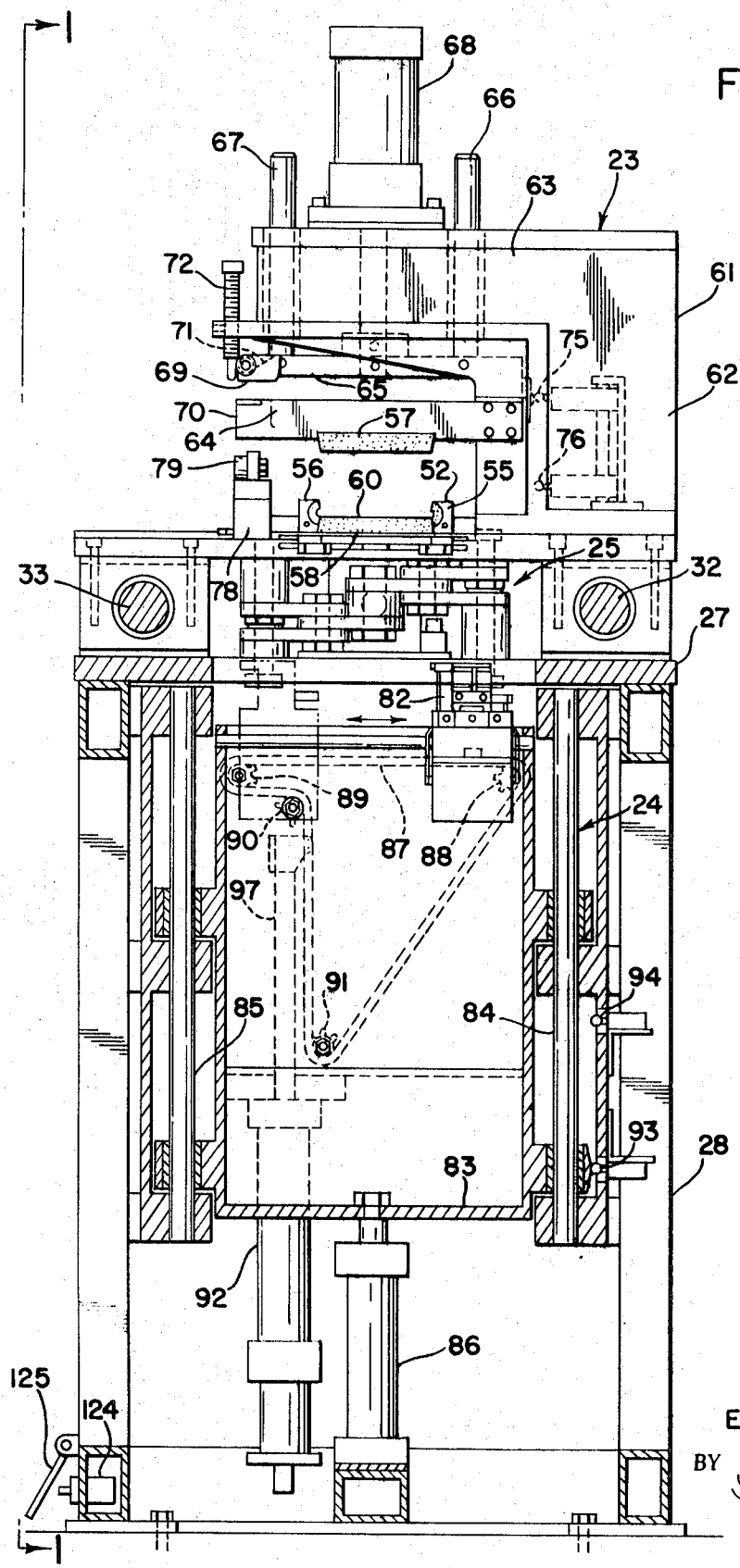
FIG. 2 is a section of the machine viewed from the line 2—2 of FIG. 1.
Figure 6:
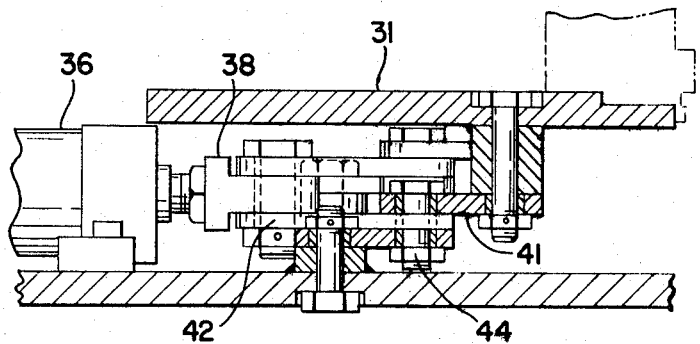
FIG. 6 is a section of the machine viewed from the line 6—6 of FIG. 3.
Figure 8:
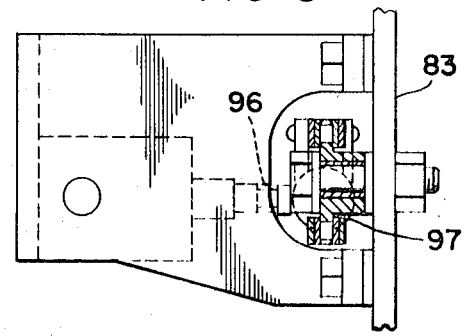
FIG. 8 is a section of the machine viewed from the line 8—8 of FIG. 1.
Figure 7:
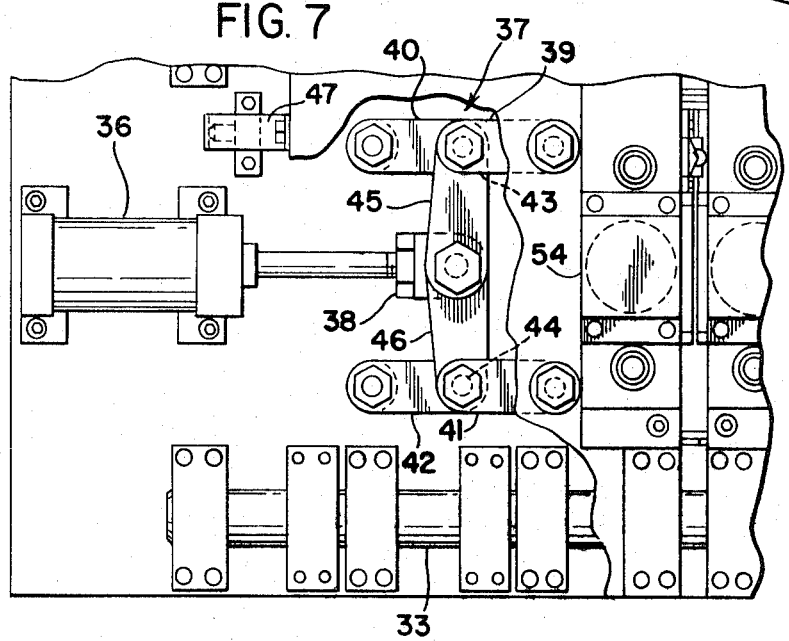
FIG. 7 is another plan view of the squeeze assembly showing the operating mechanism positioned differently from that shown in FIG. 3.
Figure 16:
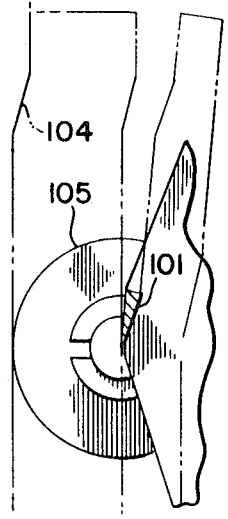
FIG. 16 is an enlarged section of the cutting knife, and cam and cam follower for determining the transverse pathway of the knife through the tube.
Figure 15:
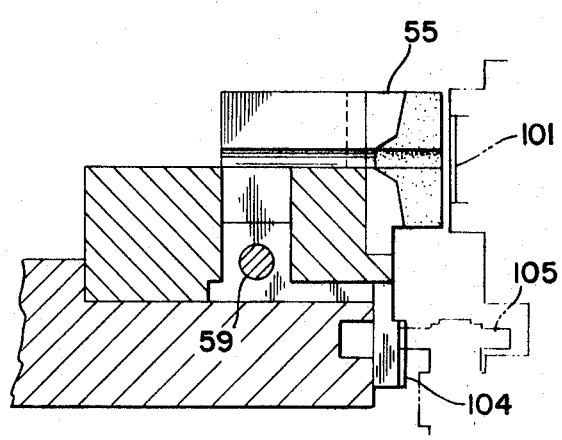
FIG. 15 is a section of the machine viewed from the line 15—15 of FIG. 10.

Referring generally to the drawing and more particularly to FIGS. 1 and 2, there is shown a machine 20 for splicing uncured or unvulcanized inner tubes, e.g. tube 21. The tube splicer 20 essentially comprises a frame or undercarriage 22, which supports a clamp assembly 23 for holding opposing ends of the inner tube 21 in aligned, spaced relation; a cutter assembly 24 for cutting the exposed ends of the inner tube 21; and a squeeze assembly 25 for bringing the freshly cut tube ends into compressive, splicing engagement.

The upstanding machine frame 22 comprises a platform 27 mounted in horizontal relation on a vertical base 28, which is bolted to the floor of a factory building.

SQUEEZE ASSEMBLY

The squeeze assembly 25 (FIGS. 1–8) comprises a pair of squeeze tables 30 and 31 slidably mounted in spaced, aligned relation on a pair of guide rods 32 and 33, which are mounted in horizontal parallel relation on the platform 27 of the machine frame 22. The squeeze table 30, although fixed during normal operation of the tube splicer 20, is adjustable about one-fourth inch along the guide rods 32 and 33 by any suitable means, e.g. adjusting screw 34 and manually operated crank 35, to vary the lateral position of the exposed tube ends relative to the fixed-cutting pathway of the cutter assembly 24.

The opposing squeeze table 31 is movable to bring the freshly cut tube ends into abutting, compressed, splicing engagement. A pneumatic cylinder 36 is mounted on the machine platform 27 and used for operating or reciprocating the squeeze table 31 along the guide rods 32 and 33. A squeeze linkage 37 is coupled between the pneumatic cylinder 36 and squeeze table 31 for exerting axial force against the squeeze table 31 in response to axial movement of the protruding piston rod 38 relative to the pneumatic cylinder 36.

The squeeze linkage 37 (FIGS. 3–7) comprises two opposing pairs of rotatable links 39 and 40, and 41 and 42, which are mounted in fully extended parallel relation between the squeeze table 31 and machine platform 27, and coupled together at pivot pins 43 and 44. A pair of link arms 45 and 46 connect the protruding piston rod 38 in driving relation with the pivot pins 43 and 44. The retracted and extended positions of the squeeze linkage 37 and its operation should be readily apparent from FIGS. 3 and 7.

The squeeze linkage 37 is such that the outwardly directed or lateral components of force exerted by the links 39 and 41 against the squeeze table 31, are in opposing directions, nullifying each other so to speak, and will not adversely affect movement of the squeeze table 31 along the guide rods 32 and 33. It is only the axial components of force which are utilized to move the squeeze table 31 along its pathway. This prevents undue wear on the guide rods 32 and 33. The pneumatic cylinder 36 is completely stroked out when the squeeze table 31 is in its fully extended position where the tube ends are in compressed, splicing engagement.

A conventionally designed time switch is used for actuating operation of the pneumatic cylinder 36 to retract the squeeze table 31 after sufficient time has elapsed to form a good splice. A limit switch 47 (FIG. 1) is provided for engaging the squeeze table 31, when it is fully retracted, or in a rest position.

CLAMP ASSEMBLY

The clamp assembly 23 (FIGS. 1, 2) comprises a pair of clamps 51 and 52, which are carried by the squeeze tables 30 and 31, respectively. A set of clamp presses 53 and 54 are mounted for unitary movement with the clamps 51 and 52 squeeze tables 30 and 31.

Figure 10:
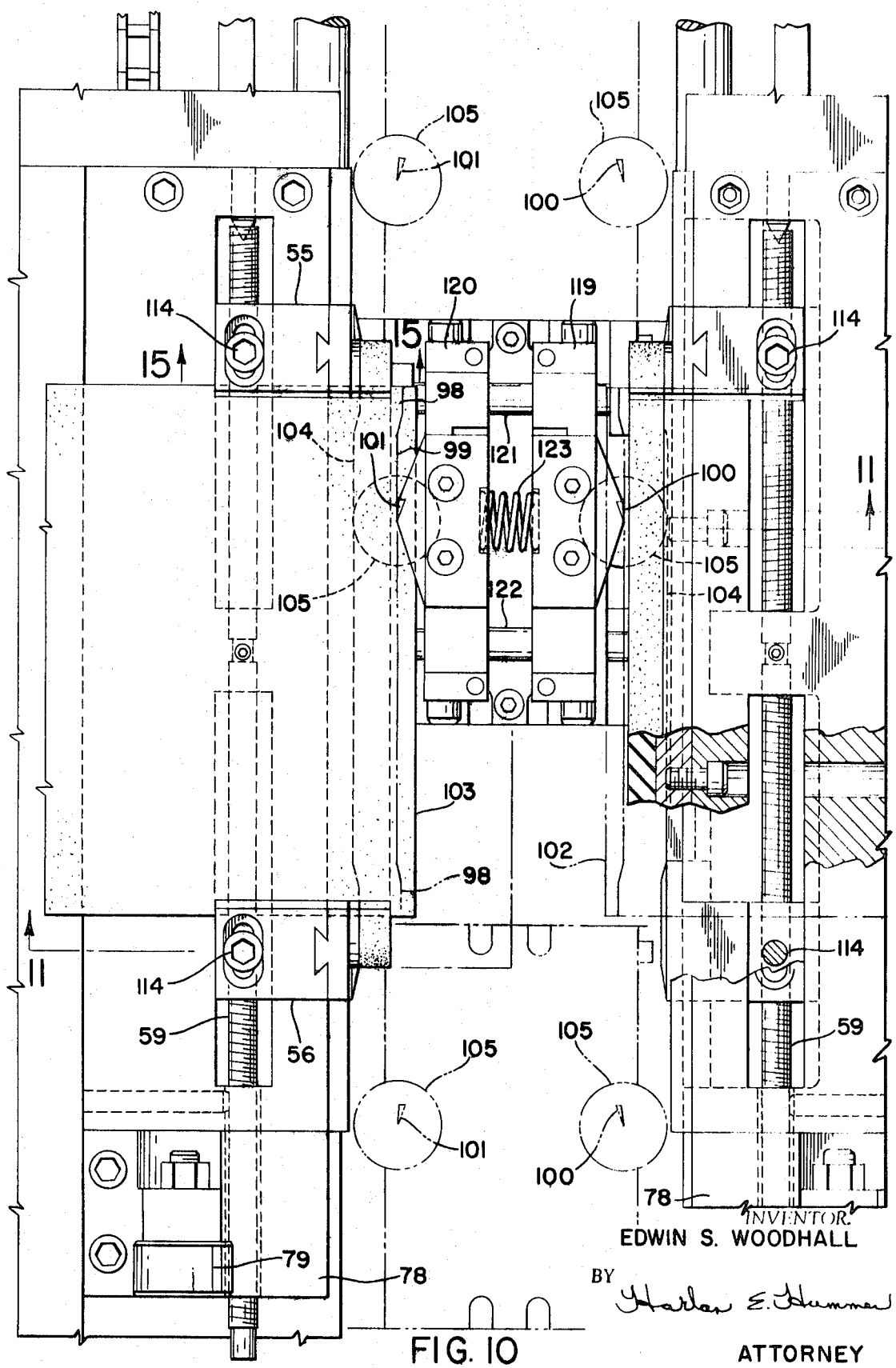
FIG. 10 is an enlarged section of the machine viewed from the line 10—10 of FIG. 1.
Figure 11:
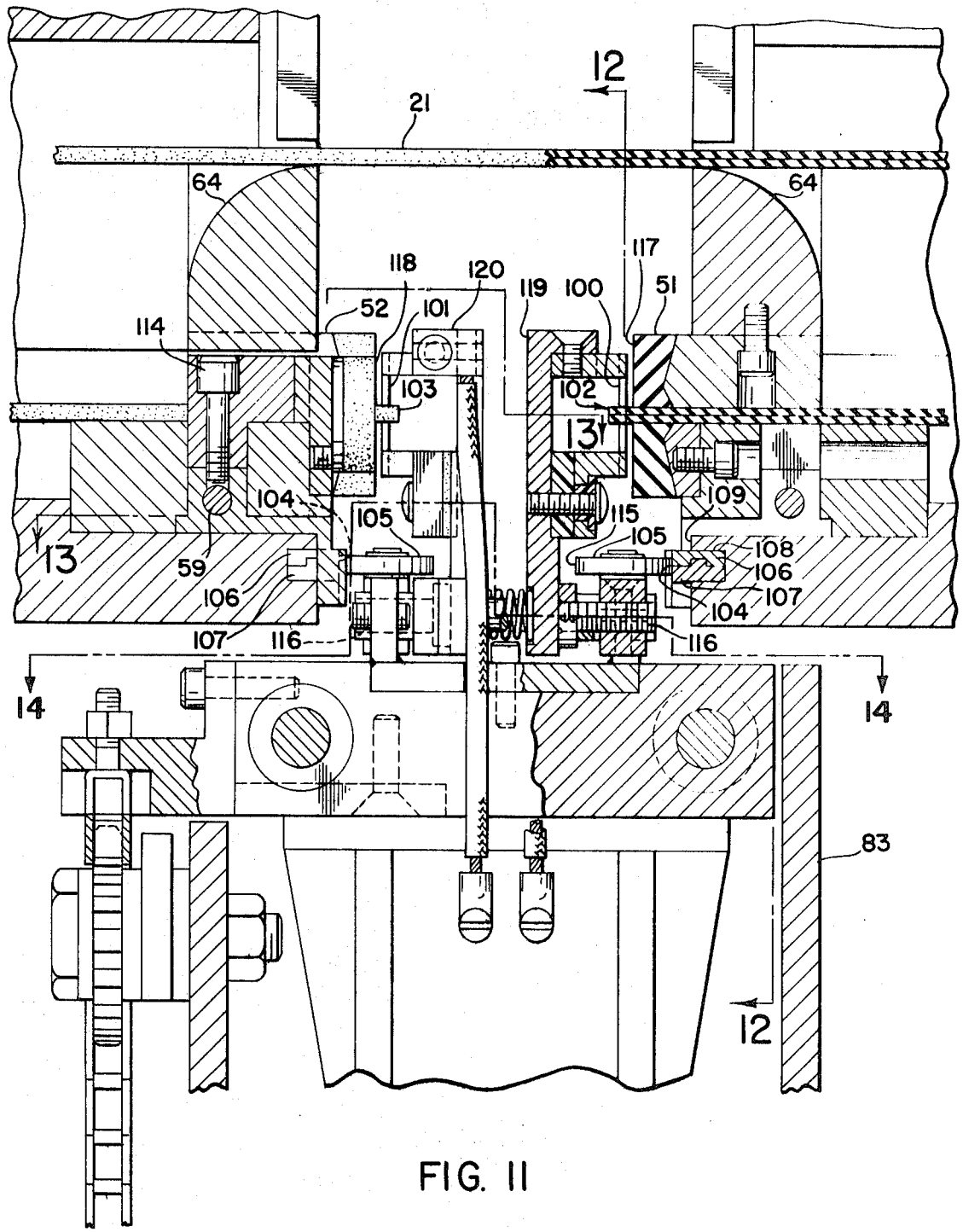
FIG. 11 is a section of the machine viewed from the line 11—11 of FIG. 10.
Figure 12:
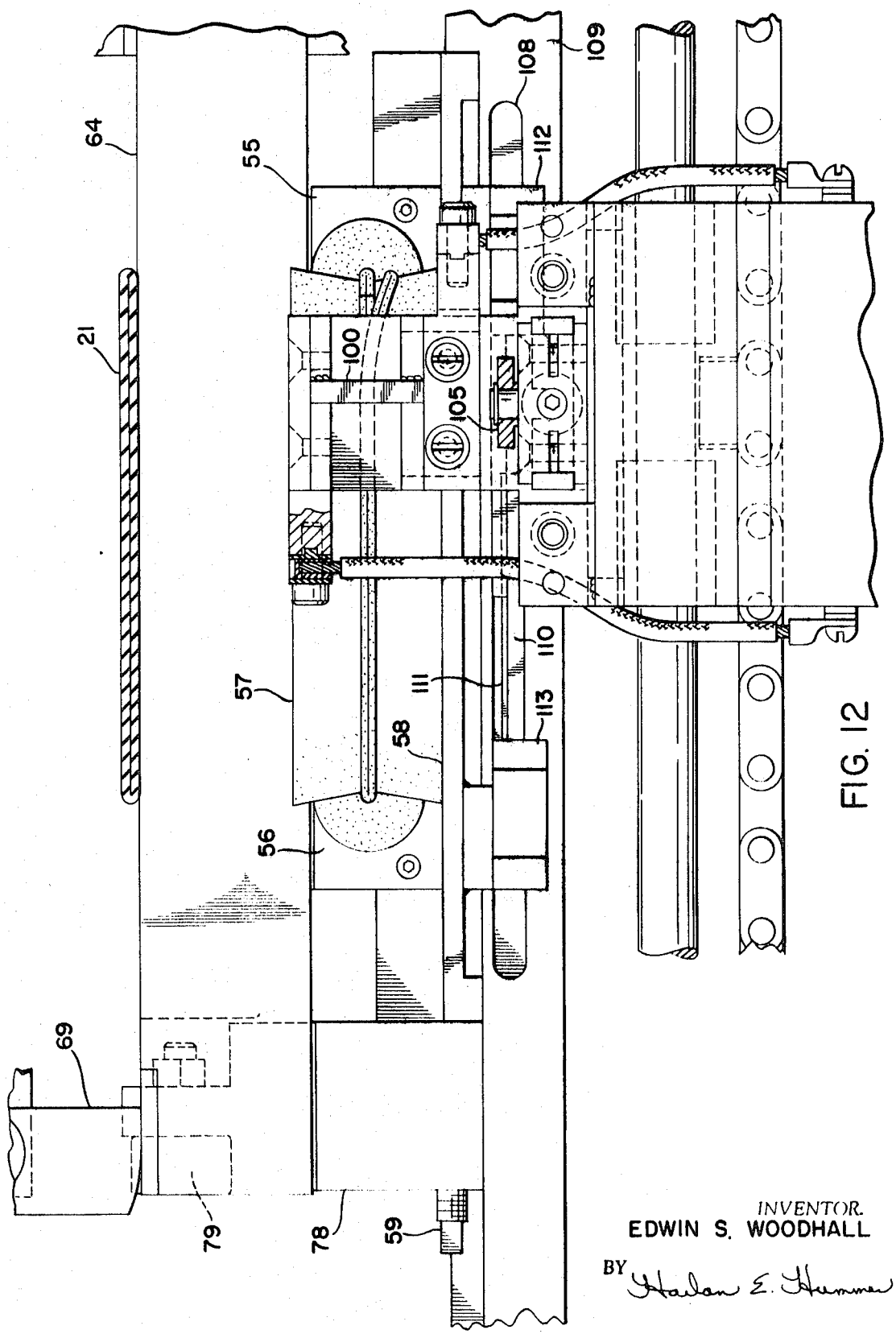
FIG. 12 is a section of the machine viewed from the line 12—12 of FIG. 11.
Figure 13:
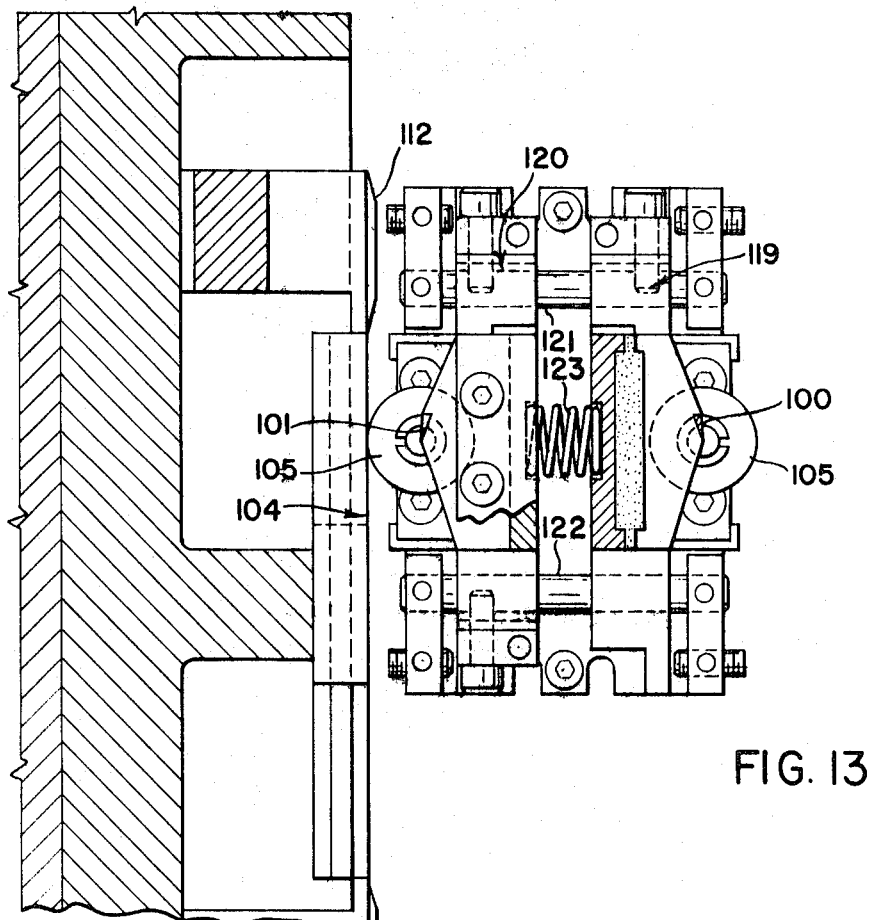
FIG. 13 is a section of the machine viewed from the line 13—13 of FIG. 11.
Figure 14:
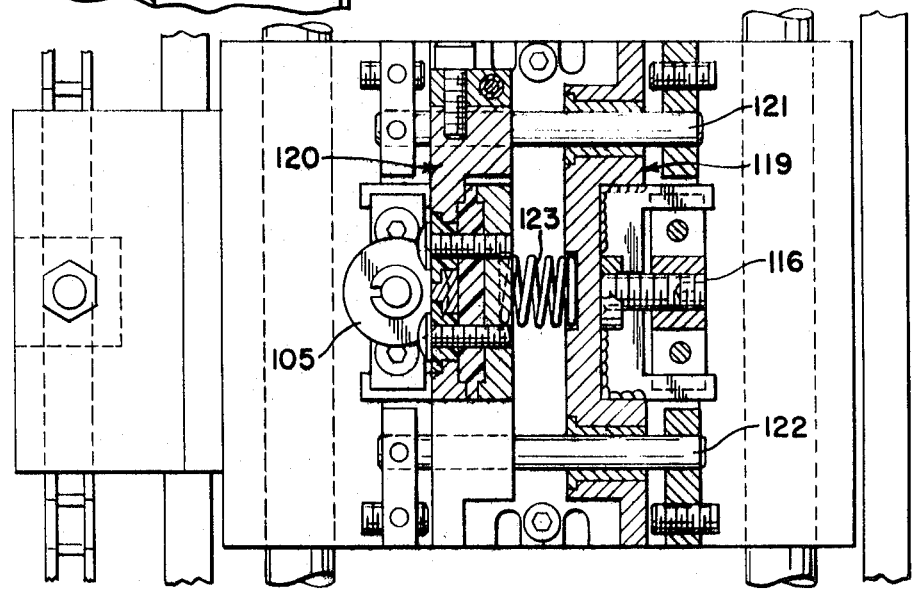
FIG. 14 is a section of the machine viewed from the line 14—14 of FIG. 11.

Each of the clamps 51 and 52 (FIGS. 2 and 9) is adjustable to accommodate different sized tubes and comprises a pair of end sections 55 and 56 and top and bottom sections 57 and 58, all of which are removable from the squeeze tables 30 and 31. The end sections 55 and 56 are operatively connected to an adjusting screw 59 (FIGS. 9, 10), which is rotated to axially move the end sections 55 and 56 relative to each other, or laterally relative to the longitudinal axis of the squeeze tables 30 and 31 to vary the distance or spacing between the end sections 55 and 56. The proper size top and bottom sections 57 and 58 are then inserted and firmly clamped between the end sections 55 and 56. The clamp sections 55-58 are each provided with a band 60 of elastomeric material, e.g. rubber, adjacent the ends of the tube 21.

Each of the clamp presses 53 and 54 (FIGS. 1, 2, and 9) comprises an inverted L-shaped frame 61 having an upstanding leg 62 and an outstanding arm 63, which extends in parallel relation over the clamps 51 and 52 firmly positioned in parallel relation on the squeeze tables 30 and 31.

An upper jaw 64 is disposed intermediate each outstanding arm 63 and corresponding clamp for carrying the top clamp sections 57. A press beam 65 is associated with each upper jaw 64. The sets of upper jaws 64 and press beams 65 are mounted for unitary reciprocating vertical movement between the press arms 63 and corresponding clamps. The press beams 65 are each secured to a couple of guide pins 66 and 67, which are slidably mounted in vertical parallel relation on the outstanding press arms 63.

A pneumatic cylinder 68 is coupled to each press beam 65 for moving or operating them to move the top sections 57 into pressing or clamping engagement with the adjacent tube ends resting on the bottom sections 58 of the clamps 51 and 52. The upper jaws 64 are disposed in cantilevered relation between the press arms 63 and clamps 51 and 52 to permit placement and removal of the tube 21, which is draped over the upper jaws 64.

A finger 69 is carried by each press beam 65 for engaging the adjacent free ends 70 of the upper jaws 64 to transfer clamping force to the upper jaws 64 at this point and insure uniform clamping engagement between the top mold sections 57 and tube 21. Each finger 69 is rotatably mounted on the press beam 65 and biased downwardly against the upper jaw 64 by a spring 71. A screw 72, vertically adjustable on each clamp press arm 63, is provided for engaging and rotating each finger 69 of engagement with the upper jaws 64 as the press beams 65 retract. The fingers 69 are retracted to partially concealed positions on the press beams 65, where they are out of interfering relation with tube removal from the tube splicer 20.

A set of vertically spaced limit switches 75 and 76 (FIG. 2) are used to sense the vertical travel or position of each upper jaw 64 and press beam 65. A pair of brackets 77 and 78 are secured in upstanding relation on the squeeze tables 30 and 31 and threadably receive the screws 59 for adjusting the clamps 51 and 52. The brackets 77 and 78 each carry a roller 79 for engaging and guiding the upper jaws 64 and associated top mold sections 57 into clamping relation with the tube 21. A clamping pressure of about 20,000 pounds per square inch is exerted by the clamps 51 and 52 against the tube 21.

CUTTER ASSEMBLY

The cutter assembly 24 (FIGS. 1, 2, 10-16) comprises a cutter head 82 movable through a generally rectangular pathway in a vertical plane passing between the squeeze tables 30 and 31 in parallel relation to adjacent aligned faces of the tube clamps 51 and 52. The cutter head 82 is carried vertically by a carriage 83, which is slidably mounted on a pair of vertical guide rails 84 and 85 disposed in parallel relation on the machine base 28. A pneumatic cylinder 86 is coupled to the carriage 83 for operating or reciprocating it to move the cutter head 82 vertically relative to the clamps 51 and 52 positioned on the squeeze tables 30 and 31.

The cutter head 82 is fastened to a chain belt 87, which is reeved around a number of pulleys or sprocket wheels 88-91 rotatably mounted in predetermined spaced relation on the carriage 83. The cutter head 82 is secured to the chain belt 87 between horizontally disposed sprocket wheels 88 and 89, and reciprocates horizontally or parallel to the clamps 51 and 52 in response to movement of the chain belt 87.

A conventionally designed combination air-hydraulic cylinder 92 is mounted for unitary movement with the carriage 83 and is operatively connected to the chain belt 87 between the vertically disposed sprocket wheels 90 and 91. The air-hydraulic cylinder 92 is operated to move the chain belt 87 vertically between the sprocket wheels 90 and 91 and consequently reciprocate the cutter head 82 horizontally between the sprocket wheels 88 and 89.

A set of vertically spaced limit switches 93 and 94 (FIG. 2) are provided for sensing the vertical position or travel of the carriage 83. A second set of vertically spaced limit switches 95 and 96 (FIG. 1) are adjustable to regulate the vertical position or travel of the piston rod 97 protruding from the air-hydraulic cylinder 92 and fastened to the chain belt 87. The axial position of the cutter head 82 between the horizontally spaced sprocket wheels 88 and 89, is correspondingly regulated to adjust the horizontal travel of the cutter head 82 relative to the clamps 51 and 52. For example, should it be desirable to cut a 6-inch-width tube, the distance between limit switches 95 and 96 would be set to maintain the travel of the piston rod 97 and cutter head 82 at about 8 inches, such that the cutter head 82 comes to a halt or rest about 2 inches on either side of the tube. As previously indicated, one of the important factors in making a good splice is the speed at which the freshly cut tube ends are brought together into splicing engagement. It has been found that the complete cutting cycle has been substantially reduced from about 55 seconds to about 28 seconds by adjusting or regulating the horizontal travel or stroke of the cutter head 82 relative to the clamps 51 and 52.

A pair of cutting knives 100 and 101 (FIGS. 9-16) are mounted in parallel relation on the cutting head 82 for engaging and cutting the adjacent, exposed ends 102 and 103 of the tube 21 extending beyond or overhanging the clamps 51 and 52. Each of the knives 100 and 101 has a relatively long, tapering, triangular cross section whose vertex or point is designed to first engage and cut the tube 21. The knives 100 and 101 are each in an electrical circuit for heating the knives 100 and 101 to facilitate cutting the rubberized tube material.

The knives 100 and 101, as they move transversely in cutting relation across the exposed tube ends 102 and 103, are preferably guided along opposing, horizontally concave pathways to provide greater compressive engagement at the opposing shoulders or edges 98 (FIG. 10) of the tube 21, since this particular area has been found to be more critical than the tube ends or surfaces 99 intermediate the tube shoulders 98.

A guide assembly, including a cam 104 and cam follower 105, is associated with each of the knives 100 and 101 for guiding the knives along the aforementioned tube cutting, concave pathway. Each cam 104 (FIGS. 9 and 11) comprises a couple of juxtaposed cam slides 106 and 107, which are keyed together for axial sliding movement relative to each other and in an elongated slot 108 horizontally disposed in the adjacent edge 109 of each of the squeeze tables 30 and 31. The cam slides 106 and 107 have flat vertically aligned camming surfaces 110 and 111, which act as a straight edge between a pair of specially configured wedges or projections 112 and 113 extending from opposing ends of the cam slides 106 and 107. The distance between the wedges 112 and 113 is adjustable in corresponding relation to the spacing between the end mold sections 55 and 56. The wedges 112 and 113 are preferably mounted for unitary movement with the end clamp sections 55 and 56. A mechanism, e.g. slot and adjusting pin, indicated at 114, is provided for slightly adjusting the position of the end clamp sections 55 and 56 relative to the wedges 112 and 113.

Each cam follower 105 includes a horizontally disposed rotatable guide wheel or roller 115 for rolling engagement along each cam 104 defined by the straight line camming surfaces 110 and 111 and protruding wedges 112 and 113 of the cam slides 106 and 107. Each guide wheel 115 is laterally adjustable by any suitable means, e.g. set screw 116, to bring the knives 100 and 101 into closer cutting engagement adjacent opposing sides 117 and 118 of the tube clamps 51 and 52.

The knives 100 and 101 and their adjustable cam followers 105 form a pair of knife assemblies 119 and 120, which are slidably mounted in side-by-side parallel relation on a couple of guide rails 121 and 122 (FIGS. 13-14) disposed in parallel relation on the cutter head 82. A coil spring 123 is centrally disposed between the guide rails 121 and 122 for biasing the two-knife assemblies 119 and 120 in a direction away from each other and the guide wheels 115 in rolling engagement along the cams 104.

OPERATION OF THE TUBE SPLICER

Referring more particularly to FIGS. 17A-17G and assuming that the operating parts of the tube splicer 20 are in their fully retracted or rest positions (FIGS. 1, 2), the tube 21 is placed in draped position over the upper jaws 64, and the exposed tube ends 102 and 103 are positioned against the bottom mold sections 58 in partially overhanging relation in the clamps 51 and 52. Assuming the squeeze table 30 and the guide wheels 115 are in adjustment relative to each other, the air cylinders 68, associated with the clamp assembly 23, are actuated to move the top clamp sections 57 downward into compressed, clamping engagement with the tube 21. The limit switch 76 is tripped as the air cylinder 68 strokes out and responds to actuate the air cylinder 86 for operating the carriage 83.

The carriage 83 is raised to position the cutter head 82 adjacent the clamps 51 and 52, such that the cutting knives 100 and 101 are in aligned cutting relation with the exposed tube ends 102 and 103 extending beyond the clamps 51 and 52. The limit switch 94 is tripped as the air cylinder 86 strokes out and responds to actuate operation of the air-hydraulic cylinder 92 for moving the cutting knives 100 and 101 transversely between the clamps 51 and 52 in cutting engagement with the exposed tube ends 102 and 103. The knives 100 and 101 move at a cutting speed of about 5 feet per minute. The limit switch 95 is tripped by the piston rod 97 of the air-hydraulic cylinder 92, when the cutter head 82 reaches the end of its stroke or travel where the cutting knives 100 and 101 are disengaged from the tube 21. The limit switch 95 responds to deactivate the air cylinder 86 to lower the carriage 83 and cutting head 82 to a position out of interfering relation with the clamps 51 and 52 and squeeze assembly 25. The carriage 83 engages and trips the lower limit switch 93, which responds to actuate operation of the air cylinder 36 to move the squeeze linkage 37 and clamp 52 towards the opposing clamp 51, thereby bringing the freshly cut exposed tube ends 102 and 103 into compressive, abutting, splicing engagement.

Meanwhile, the air-hydraulic cylinder 92 operates to move the cutter head 82 back to its rest position in closer spaced relation adjacent the upstanding legs 62 of the clamp presses 53 and 54. A conventionally designed time switch deactivates the air cylinders 68 to unclamp the upper jaws 64 and retract the top clamp sections 57. The upper jaws 64, as they move upwards, engage and trip the limit switch 75 which responds and deactivates the air cylinder 36 to retract the squeeze table 31 and clamp 52 to its rest position to permit removing the spliced tube 21 from the tube splicer 20. The components of the machine are now in their fully retracted and rest positions ready for recycling to splice another tube positioned in the tube splicer 20.

A safety switch 124 and operating kickplate 125 (FIG. 2) are provided for bypassing the normal operating sequence of the tube splicer 20 to return all mechanisms to their fully retracted rest positions should any accident befall the operator of the machine.

SECONDARY EMBODIMENT OF THE INVENTION

Figure 18:
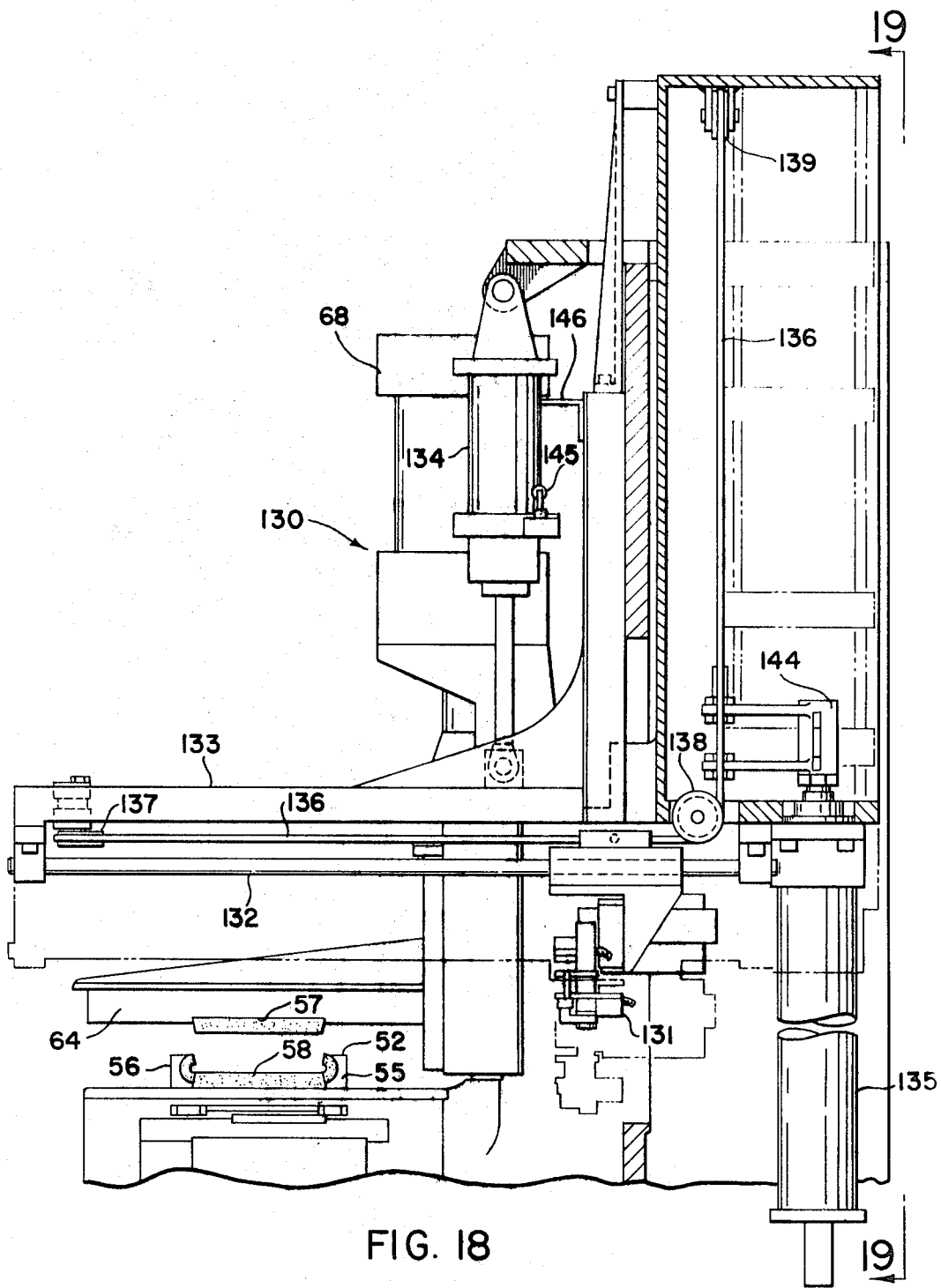
FIG. 18 is a side view of another embodiment of the invention.

The tube splicer 130 (FIGS. 18, 19) is, in many respects, similar to the tube splicer 20. Therefore, similar reference numerals will be used to identify like parts. The essential difference between the tube splicers 130 and 20 is in the vertical location of the cutter heads relative to the tube clamps 51 and 52. The cutter head 131 of the tube splicer 130 is disposed in vertical spaced relation above the clamps 51 and 52, whereas the cutter head 82 of the tube splicer 20 is in vertical spaced relation below the clamps 51 and 52.

The cutter head 131 is slidably mounted on a set of guide rails, e.g. guide rail 132, disposed in parallel horizontal relation on a movable carriage 133, which is mounted for vertical movement between the clamp presses 53 and 54. A pneumatic cylinder 134 is coupled to the carriage 133 for operating or moving the carriage 133 and attached cutter head 131, downward to a position where the cutting knives 100 and 101 will engage and cut the tube ends 102 and 103, as the cutter head 131 moves transversely between the clamps 51 and 52. The pneumatic cylinder 134 is completely stroked out when the cutter head 131 is in this particular position.

A similar air-hydraulic cylinder 135 is operatively connected to the cutter head 131 for reciprocating it along the guide rails 132 by any suitable means. For example, the cutter head 131 and air-hydraulic cylinder 135 are secured to a cable 136, which is reeved around a number of strategically located pulleys 137-139 rotatably mounted on the carriage 133.

A series of vertically spaced limit switches 140-143 and a switch-tripping mechanism 144 are provided for sensing the vertical operating positions of the air-hydraulic cylinder 135 and consequent horizontal travel of the cutter head 131. For example, when the tripper 144 moves between the first two limit switches 140 and 141, the cutter head 131 will correspondingly move from its closest position adjacent the air-hydraulic cylinder 135 to a point adjacent the tube 21 positioned in the clamps 51 and 52. The cutter head 131 moves in cutting relation across the tube 21, when the tripper 144 moves between the second and third limit switches 141 and 142, and beyond the tube 21 when the tripper 144 moves between the third and fourth limit switches 142 and 143. The cutter head 131, as it moves toward and away from the tube 21, is operated at a greater rate of speed than the speed used for cutting the tube 21, to reduce the overall time cycle for cutting the tube ends 102 and 103.

The cutter head 131 must be in its fully retracted rest position before the squeeze assembly 25 can be operated to bring the freshly cut tube ends 102 and 103 into splicing engagement. From this standpoint, the cutter head 82 of the tube splicer 20 is more conveniently located below the tube molds, since it does not have to be in a fully retracted rest position to begin operation of the squeeze assembly 25.

A limit switch 145, mounted on the pneumatic cylinder 134, is tripped by a projecting plate 146 carried by the carriage 133 to stop the carriage 133, when the cutter head 131 is properly positioned for moving along its cutting pathway. The limit switch 145 also acts to start operation of the air-hydraulic cylinder 135, which moves the cutter head 131 and cutting knives 100 and 101 horizontally, first to position the knives adjacent the tube 21 and then transversely in cutting relation across the tube 21. The pneumatic cylinder 134 is deactivated to move the carriage 133 vertically upward, when the tripper 144 engages the top limit switch 143. The air-hydraulic cylinder 135 is deactivated to move the cutter head 131 horizontally back to its fully retracted rest position adjacent the air-hydraulic cylinder 135, when the pneumatic cylinder 134 is fully retracted. The cutter heads 82 and 131 both follow a vertical, generally rectangular pathway as they move through their cutting cycles.

Thus, there has been provided a new and novel tube splicer for splicing inner tubes and like material at a highly improved rate of speed, thereby providing a highly improved splice.

While certain representative embodiments and details have been shown for the purpose of illustrating the invention, it will be apparent to those skilled in the art that various changes and modifications may be made therein without departing from the spirit or scope of the invention.

What is claimed is:

1. A tube splicer, comprising in combination:
   a. a pair of clamps for holding exposed ends of an unvulcanized rubber tube in aligned, spaced relation to each other and in overhanging relation to adjacent faces of the clamps;
   b. a cutter for engaging and cutting the exposed tube ends overhanging the clamps;
   c. means for causing relative movement between the clamps to bring the freshly cut exposed ends of the tube into compressed splicing engagement; and
   d. means for moving the cutter through a generally rectangular pathway between adjacent faces of the clamps to cut the exposed tube ends as the cutter moves transversely between the clamps and to retract the cutter out of interfering relation with the clamps as the clamps move to bring the freshly cut tube ends into splicing engagement.

2. The tube splicer of claim 1, which includes means for positioning the cutter in vertical spaced relation above the clamps.

3. The tube splicer of claim 1, which includes means for positioning the cutter in vertical spaced relation below the clamps.

4. The tube splicer of claim 1, which includes means for varying the travel of the cutter transversely to the axis along which the clamps relatively move.

5. A tube splicer comprising in combination:
   a. a pair of clamps for holding exposed ends of an unvulcanized rubber tube in axially aligned spaced, overhanging relation;
   b. a cutter for engaging and cutting the tube ends overhanging the clamps;
   c. means for positioning the cutter in spaced vertical relation to the clamps;
   d. means for moving the cutter vertically to position the cutter for engaging the overhanging tube ends;
   e. means for horizontally moving the cutter transversely between the clamps to cut the overhanging tube ends;
   f. means for moving the cutter out of interfering relation with the clamps after the overhanging tube ends are cut; and
   g. means for causing relative movement between the clamps to bring the freshly cut tube ends into compressed splicing engagement.

6. The tube splicer of claim 5, wherein the cutter is positioned vertically above the clamps.

7. The tube splicer of claim 5, wherein the cutter is positioned vertically below the clamps.

8. The tube splicer of claim 7, wherein the cutter includes a set of cutting knives disposed in parallel relation and means for heating said knives.

9. The tube splicer of claim 8, wherein the means (d) includes means for raising the cutter relative to the clamps and to a position where the knives will, if horizontally moved, engage the tube ends.

10. The tube splicer of claim 9, wherein the means (f) includes means for lowering the cutter relative to the clamps.

11. The tube splicer of claim 10, which includes means for varying the transverse travel of the cutter relative to the clamps.

12. The tube splicer of claim 11, which includes means for varying the starting position from which the cutter moves in transverse relation to the clamped tube ends.

13. The tube splicer of claim 12, wherein the means (g) includes means for holding one of the pair of clamps stationary and means for moving the other of the pair of clamps adjacent the stationary clamp.

14. The tube splicer of claim 13, wherein the means for holding one of the pair of clamps stationary, is adjustable to axially position the clamp held thereby relative to the cutting pathway of the adjacent knife.

15. The tube splicer of claim 14, wherein the means for moving the other of the pair of clamps includes: a linkage system wherein any lateral component of force relative to the axis along which the clamp moves, has an opposing equal lateral component of force; and means for operating the linkage system.

16. The tube splicer of claim 15, wherein the linkage system comprises two opposing pairs of links pivotally mounted in spaced relation on a squeeze table carrying the movable clamp, and a link arm pivotally mounted on adjoining ends of each pair of said two opposing pairs of links.

17. The tube splicer of claim 16, wherein the means for operating the linkage system includes a pneumatic cylinder having a protruding piston rod pivotally mounted on free ends of the link arms.

18. The tube splicer of claim 12, wherein the means for raising and lowering the cutter relative to the clamps includes a carriage slidably mounted for vertical movement and a pneumatic cylinder coupled to the carriage for reciprocating it to raise and lower the cutter.

19. The tube splicer of claim 18, wherein the means for varying the travel and starting position of the cutter includes means for mounting the cutter for unitary vertical movement with the carriage and horizontal movement relative thereto, and means for varying the horizontal position of the cutter relative to the carriage.

20. The tube splicer of claim 19, wherein the cutter mounting means includes at least two horizontally spaced sprocket wheels, a chain belt extending between and reeved on said sprocket wheels, and means for fastening the cutter to the chain between said sprocket wheels.

21. The tube splicer of claim 20, wherein means for varying the horizontal position of the cutter relative to the carriage includes a combination air-hydraulic cylinder operatively connected to the chain belt, and means for varying the stroke of the piston within the cylinder.

22. The tube splicer of claim 12, which includes an upper jaw disposed in horizontally cantilevered relation vertically above each clamp and carrying top sections of said clamps, and means for transmitting a downward clamping force against the free cantilevered end of each upper jaw when top sections of the clamps are moved by the upper jaws into clamping engagement with bottom sections of the clamps.

23. The tube splicer of claim 22, wherein the force-transmitting means includes a finger rotatable into and out of engagement with the free cantilevered end of each upper jaw, means for rotating the fingers into engagement with said ends when the jaws move towards said clamps, and means for rotating the fingers substantially parallel to the jaws when the jaws move away from said clamps.

24. The tube splicer of claim 12, which includes means for guiding the cutting knives along predetermined transverse pathways between the clamps.

25. The tube splicer of claim 24, wherein the guide means for the cutting knives includes a pair of generally parallel straight edges and a pair of configured projections adjacent the ends of each straight edge, said projections extending towards each other and the opposing straight edge.

26. The tube splicer of claim 25, which includes means for varying the spacing between the projections.

27. The tube splicer of claim 26, wherein each clamp includes a pair of end sections for encompassing opposing edges of a tube, a pair of removable sections intermediate the end sections, and means for varying the spacing between the end sections to accommodate different size tubes.

28. A tube splicer comprising in combination:

a. a machine stand;
b. a pair of guide rods mounted in horizontal parallel relation on the machine stand;
c. a pair of squeeze tables slidably mounted on the guide rods for supporting a pair of clamps holding opposing ends of a tube;
d. means for causing relative reciprocating movement between the squeeze tables to bring the clamped tube ends together in splicing engagement;
e. a clamp press carried by each squeeze table, including
  1. an upstanding frame;
  2. a jaw extending in cantilevered relation from the frame for supporting a clamp portion;
  3. means for reciprocating the jaw relative to the squeeze table to operate the clamp;
f. a carriage slidably mounted in vertical spaced relation below the squeeze tables;
g. means for reciprocating the carriage vertically relative to the squeeze tables;
h. a cutter including a pair of parallel cutting knives;
i. means for mounting the cutter for unitary reciprocating movement with the carriage;
j. means for reciprocating the cutter horizontally relative to the carriage;
k. means for varying the horizontal position from which the cutter starts to reciprocate; and
l. means for varying the horizontal travel of the cutter.

29. The tube splicer of claim 28, wherein the means (d) includes:
m. a squeeze linkage for moving one of the squeeze tables, said linkage comprising a plurality of assembled links wherein any lateral component of force relative to the axis along which the one squeeze table moves, has an opposing and equal lateral component of force; and
n. means for operating the squeeze linkage in response to retraction of the cutter out of interfering relation with the squeeze linkage.

30. The tube splicer of claim 29, which includes:
o. means for adjusting the axial position of the other of the squeeze tables along the guide rods prior to operating the squeeze linkage.

31. The tube splicer of claim 30, wherein the cutter is first moved upwards and in a rectangular vertical pathway to cut the tube ends and retract out of interfering relation with the squeeze linkage.

32. The tube splicer of claim 31, which includes a pair of clamps, each of said pair of clamps including:
  1. a pair of end mold sections mounted in spaced relation on one of the pair of squeeze tables;
  2. a bottom section removably positioned between said end sections;
  3. a top section carried by an adjacent clamp press jaw and movable between the end sections; and
  4. means for varying the spacing between the end sections to accommodate different size tubes.

33. The tube splicer of claim 32, which includes means for guiding the cutting knives along a predetermined tube-cutting pathway relative to the clamps, said means including:
  1. a pair of generally parallel straight edges;
  2. a pair of configured projections disposed in spaced relation adjacent the ends of each straight edge, said projections extending towards each other and the opposing adjacent straight edge; and
  3. means for varying the spacing between the projections in predetermined corresponding relation to the spacing between the end sections of the clamps.

34. A tube splicer comprising in combination:
a. a pair of aligned clamps for holding opposing ends of an unvulcanized tube in exposed, overhanging relation;
b. a pair of knives for cutting the exposed ends of the tube overhanging the clamps;
c. means for positioning the knives in vertical spaced relation below the clamps;
d. means responsive to clamping of the tube, for raising the knives to a predetermined first position where the knives are in cutting aligned relation with the exposed tube ends;
e. means responsive to the knives in the first position, for moving the knives transversely between the clamps in cutting engagement with the exposed tube ends to a second position where the knives are disengaged from the tube; and
f. means responsive to the knives in the second position, for lowering the knives to a third position where the knives are out of interfering relation with the clamps.

35. The tube splicer of claim 34, which includes:
g. means responsive to the knives in the third position for moving at least one of the pair of clamps to bring the freshly cut tube ends into compressive, abutting, splicing engagement.

36. The tube splicer of claim 35, which includes:
h. means responsive to the holding of the tube ends in splicing engagement for a predetermined period of time, for releasing the clamps permitting removal of the tube, and moving the clamps back to their rest positions in farthest spaced relation.

37. The tube splicer of claim 36, which includes:
i. means for moving the knives back to their rest positions below the clamps as the clamps move the tube ends into splicing engagement.

38. The tube splicer of claim 34, wherein the means (c), (d), and (f) include:
k. a carriage for carrying the cutting knives; and
m. means for reciprocating the carriage towards and away from the clamps.

39. The tube splicer of claim 38, wherein the means (e) includes:
n. a pair of aligned sprocket wheels disposed in parallel relation to the clamps;
o. a belt reeved at least partially around the sprocket wheels;
p. means for moving the belt between the sprocket wheels; and
q. means for mounting the knives for unitary movement with the belt between the sprocket wheels.

40. The tube splicer of claim 39, wherein the means (p) includes an air-hydraulic cylinder coupled to the belt, and means for adjusting the stroke of the piston in the cylinder.

41. The tube splicer of claim 40, wherein the means (m) includes a guideway along which the carriage moves and an air cylinder coupled to the carriage for reciprocating the carriage along the guideway.

42. The tube splicer of claim 34, which includes means for biasing the knives in a direction away from each other.

43. The tube splicer of claim 42, which includes a cam follower carried by each knife and coupled thereto for unitary movement therewith, and a cam associated with each cam follower for engaging and guiding the cam follower along a pathway corresponding to the pathway along which the coupled knife moves in cutting relation through the tube.

44. The tube splicer of claim 43, which includes means for adjusting the cam followers laterally relative to the cutting axes along which the knives move.

45. The tube splicer of claim 34, which includes a pair of upper jaws disposed in cantilevered parallel relation above the clamps for carrying a portion thereof and supporting a portion of the tube resting thereon when the tube is placed in the tube splicer, a clamp press extending over each upper jaw and movable in unison therewith, and a finger carried by each clamp press and rotatable into and out of engagement with the adjacent cantilevered end of each upper jaw.

46. The tube splicer of claim 45, which includes means for biasing the fingers into engagement with the upper jaw and means disposed adjacent the clamp presses for engaging and rotating the fingers out of engagement with the clamp presses as the presses move in a direction away from the clamps.

* * * * *

UNITED STATES PATENT OFFICE
CERTIFICATE OF CORRECTION

Patent No. 3,623,932                    Dated November 30, 1971

Inventor(s)   Edwin S. Woodhall

It is certified that error appears in the above-identified patent and that said Letters Patent are hereby corrected as shown below:

Column 3, line 6, "and" should appear after "52".
" 3, line 52, should read "each finger 69 <u>out</u> of engagement".
Column 4, lines 24 and 25, should read "95 and 96" instead of 95 and 95".

Signed and sealed this 23rd day of May 1972.

(SEAL)
Attest:

EDWARD M.FLETCHER,JR.           ROBERT GOTTSCHALK
Attesting Officer               Commissioner of Patents